United States Patent
Sinclair (10) Patent No.: US 9,024,908 B2
(45) Date of Patent: May 5, 2015

(54) TACTILE FEEDBACK DISPLAY SCREEN OVERLAY

(75) Inventor: Mike Sinclair, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 374 days.

(21) Appl. No.: 12/495,431

(22) Filed: Jun. 30, 2009

(65) Prior Publication Data

US 2010/0328251 A1    Dec. 30, 2010

(51) Int. Cl.
G06F 3/045 (2006.01)
G06F 3/041 (2006.01)
G06F 3/01 (2006.01)
G06F 3/0488 (2013.01)

(52) U.S. Cl.
CPC ...... *G06F 3/016* (2013.01); *G06F 2203/04809* (2013.01); *G06F 3/041* (2013.01); *G06F 3/04886* (2013.01)

(58) Field of Classification Search
CPC .............. G06F 2203/04809; G06F 3/016
USPC ................................... 345/173, 174
See application file for complete search history.

(56) References Cited

U.S. PATENT DOCUMENTS

| | | | | |
|---|---|---|---|---|
| 3,757,322 A * | 9/1973 | Barkan et al. | ................. | 345/174 |
| 4,990,900 A * | 2/1991 | Kikuchi | ......................... | 345/174 |
| 5,584,054 A * | 12/1996 | Tyneski et al. | ................ | 455/566 |
| 5,742,242 A * | 4/1998 | Sellers | ............................. | 341/22 |
| 6,310,614 B1 * | 10/2001 | Maeda et al. | ................. | 345/173 |
| 6,356,259 B1 * | 3/2002 | Maeda et al. | ................. | 345/173 |
| 6,501,464 B1 * | 12/2002 | Cobbley et al. | ............... | 345/173 |
| 6,636,203 B1 * | 10/2003 | Wong et al. | ................... | 345/173 |
| 7,406,881 B2 * | 8/2008 | Tanabe | ..................... | 73/862.041 |
| 7,463,245 B2 * | 12/2008 | Marcus et al. | ................ | 345/169 |
| 7,492,347 B2 * | 2/2009 | Sato et al. | ..................... | 345/102 |
| 7,509,881 B2 * | 3/2009 | Divigalpitiya et al. | .. | 73/862.041 |
| 7,595,790 B2 * | 9/2009 | Yamamoto et al. | .......... | 345/173 |
| 7,777,726 B2 * | 8/2010 | Sato et al. | ..................... | 345/173 |
| 2002/0033795 A1 * | 3/2002 | Shahoian et al. | ............ | 345/156 |

(Continued)

FOREIGN PATENT DOCUMENTS

WO    2008037275 A1    4/2008

OTHER PUBLICATIONS

Welss et al., "SLAP Widgets: Bridging the Gap between Virtual and Physical Controls on Tabletops", Apr. 4-9, 2009, Boston, Massachusetts, USA, http://hci.rwth-aachen.de/materials/publications/weiss2009c.pdf.

(Continued)

*Primary Examiner* — Amare Mengistu
*Assistant Examiner* — Sarvesh J Nadkarni
(74) *Attorney, Agent, or Firm* — Steve Wight; Judy Yee; Micky Minhas (57) ABSTRACT

Systems are disclosed for an optically clear keyboard that can be applied to a touch-sensitive display screen, for example, while mitigating distortion of the display. An apparatus for use over a touch-sensitive display screen can comprise a plurality of button structures formed of an optically clear material. The buttons are disposed in an optically clear fluid or gel having an index of refraction equivalent to the index of refraction of the button structures. The apparatus comprises an optically clear elastomeric membrane over the fluid, which forms a sealed barrier for the fluid or gel. The volume within the sealed portion of the apparatus contains the fluid and the button structures.

20 Claims, 6 Drawing Sheets

(56) References Cited

U.S. PATENT DOCUMENTS

| | | | |
|---|---|---|---|
| 2002/0054030 A1* | 5/2002 | Murphy | 345/173 |
| 2005/0088417 A1* | 4/2005 | Mulligan | 345/173 |
| 2005/0164148 A1* | 7/2005 | Sinclair | 434/112 |
| 2005/0285846 A1* | 12/2005 | Funaki | 345/173 |
| 2006/0209037 A1* | 9/2006 | Wang et al. | 345/173 |
| 2006/0221062 A1* | 10/2006 | Wong et al. | 345/173 |
| 2006/0238510 A1* | 10/2006 | Panotopoulos et al. | 345/168 |
| 2007/0013662 A1* | 1/2007 | Fauth | 345/168 |
| 2008/0006516 A1* | 1/2008 | Nishino et al. | 200/345 |
| 2008/0297475 A1* | 12/2008 | Woolf et al. | 345/163 |
| 2009/0002205 A1* | 1/2009 | Klinghult et al. | 341/33 |
| 2009/0002328 A1* | 1/2009 | Ullrich et al. | 345/173 |
| 2009/0009480 A1* | 1/2009 | Heringslack | 345/173 |
| 2009/0015547 A1* | 1/2009 | Franz et al. | 345/156 |
| 2009/0033617 A1* | 2/2009 | Lindberg et al. | 345/156 |
| 2009/0066672 A1* | 3/2009 | Tanabe et al. | 345/176 |
| 2009/0073127 A1* | 3/2009 | Amiri | 345/168 |
| 2009/0128503 A1* | 5/2009 | Grant et al. | 345/173 |
| 2009/0135145 A1* | 5/2009 | Chen et al. | 345/173 |
| 2009/0167721 A1* | 7/2009 | Hamm et al. | 345/174 |
| 2009/0174687 A1* | 7/2009 | Ciesla et al. | 345/174 |
| 2010/0110016 A1* | 5/2010 | Ladouceur et al. | 345/173 |
| 2010/0177050 A1* | 7/2010 | Heubel et al. | 345/173 |
| 2010/0238119 A1* | 9/2010 | Dubrovsky et al. | 345/169 |
| 2011/0012851 A1* | 1/2011 | Ciesla et al. | 345/173 |

OTHER PUBLICATIONS

Fihn, Mark, "Veritas Et Visus" Oct. 2006, http://www.veritasetvisus.com/VVTP-9,%20October%202006%20--%20sample.pdf.
Raskin, Aza "iPhone and the First Generation Woes", Jul. 5, 2007, http://humanized.com/weblog/2007/07/05/iphone_and_the_first_generation_woes/.
"International Search Report", Mailed Date: Feb. 24, 2011, Application No. PCT/US2010/039557, Filed Date: Jun. 22, 2010, pp. 8.
Reply to first Chinese Office Action cited in Chinese Application No. 201080029702.2 dated Jan. 28, 2013, 16 pgs.
Second Chinese Office Action cited in Chinese Application No. 201080029702.2 dated Feb. 25, 2013, 12 pgs.
International Preliminary Report on Patentability cited in PCT Application No. PCT/US2010/039577 dated Jan. 4, 2012, 3 pgs.
First Chinese Office Action cited in Chinese Application No. 201080029702.2 dated Sep. 27, 2012, 11 pgs.
Reply to second Chinese Office Action cited in Chinese Application No. 201080029702.2 dated Apr. 27, 2013, 15 pgs.
Third Chinese Office Action cited in Chinese Application No. 201080029702.2 dated Jul. 4, 2013, 6 pgs.
"Notice of Allowance Issued in Chinese Patent Application No. 201080029702.2", Mailed Date: Nov. 7, 2013, Filed Date: Jun. 22, 2010, 4 Pages.

* cited by examiner

PRIOR ART

FIG. 8

TACTILE FEEDBACK DISPLAY SCREEN OVERLAY

BACKGROUND

Touch-sensitive devices, such as mobile phones, personal digital assistants (PDAs), portable multi-use devices, etc., have grown in popularity over the past few years, along with other traditional touch screen displays. Touch-sensitive devices, comprising a touch-sensitive display screen can allow a user to interact directly with content displayed on the display, rather than through an intermediary, such as a hardware QWERTY keyboard, and can allow the device to have a much larger display by lessening to a great extent the area dedicated to hardware buttons. Touch-sensitive display screen devices generally comprise virtual soft keys (e.g., icons displayed on the display) and touch sensors, integrated into a display, that detect a presence and location of a user's touch within the display. Software can correlate the location of the touch to an icon displayed in the vicinity of the touch to determine what a user intended to select. Several manufacturers of touch-sensitive display screen devices have opted to eliminate or substantially reduce a number of hardware keys integrated into touch-sensitive display screen devices. Instead, they typically utilize soft keys that can be selectively displayed on the screen (e.g., when user input is desired, the user touches the displayed icon).

Another type of soft key that may be used is a display of an on-screen icon placed near an otherwise unlabelled hardware button, which can be updated as desired for various functions, and can be actuated by a user pressing the associated hardware button. Reducing the number of hardware keys, can allow manufacturers to offer devices that are more sleek (e.g., relative to bulkier devices that may have a full, hardware QWERTY keyboard) and/or have a larger screen (e.g., because available space is not consumed by hardware keys). Cost of device production can be reduced as less hardware components may be needed. Additionally, consumers may benefit because the cost of the device may be cheaper and the soft keys may offer more flexibility with regards to key arrangement (e.g., users may switch between a numerical keyboard, a full QWERTY keyboard, a compact QWERTY, and since they generally comprise icons on a touch sensitive screen, soft keys may be added, subtracted, resized, rearranged, reconfigured with different functionality, etc.) than hardware keys.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While there are benefits to utilizing soft keys on touch-sensitive display screen devices, there are also several disadvantages that have discouraged some consumers from purchasing touch screen devices that predominately rely on soft keys for user input. For example, touch screen devices still have some difficulty in determining the precise location of the user's touch on the display (e.g., causing a key other than the user's intended key to be selected). Additionally users that use the device primarily for text messaging and/or email, such as enterprise users, tend to prefer hardware keys that provide haptic feedback over soft keys that do not provide a sense of touch. For example, a typical QWERTY keyboard user can identify a location of the keys by touch without much difficulty when provided with a haptic sense of location of the keys. If the user needs to identify the location of keys visually considerably more cognitive processing may be necessary, making inputting more disruptive.

There are three common haptic sensations that people may rely on when using a keyboard or keypad with hardware keys. One provides spatial feedback, which is the actual presence and positions of hard keys protruding above the keyboard that can be felt and located tactilely before a key is pressed, much like how one discovers the home keyboard position when fingers first touch the keys on a desktop keyboard, before any keys are actuated.

The second sensation is a non-linear mechanical response that one may feel when depressing and moving a hard key. At a certain point in the downward travel of the key, the force required for further travel is significantly reduced. This second sensation helps to differentiate between multiple keys being depressed and only one being actuated, such as on a crowded mobile keypad where a finger may cover (and depress) several keys. A key most centered on the actuating finger pad can reach a hysteresis threshold earlier than those of the neighboring keys which may also be depressed, causing that key to travel further downward and can be the first key to be sensed as actuated. Also, this hysteresis causes an upward or release travel force to be less than for the downward travel. This mechanical hysteresis can be caused by a plastic or metal device implemented with the key to impart this behavior.

The third sensation is a tactile key actuation or click sensed from the key that has first reached the hysteresis threshold, informing the user that a key has been actuated and to depress no further but to release. It should be noted that several manufacturers of touch-sensitive display screens electromechanically supply this third sensation, an audible or tactile click via the screen signifying that a key has been actuated. However, these current or prior solutions lack the initial spatio-tactile feeling of the relative position of the keys and the feeling of which one the user's finger is centered before actuation, which may cause an undesired (e.g., the wrong key) to be depressed. The click actuation sensation alone is typically too late to allow the user to select the correct key, and merely serves to inform the user that a key was actuated.

Further, previous and current solutions have utilized small keyboards on various areas of the devices (e.g., slide-out keyboards, on a front bottom portion, etc.). These solutions can take up valuable display screen space, and/or add to a size (e.g., thickness) and cost for the devices. Other solutions utilize removable overlays that comprise buttons on a surface, which may align over virtual keys on the display screen. However, these solutions can obscure the display screen, as the buttons may not be clear and/or can distort a view of the display.

Systems are disclosed, where an optically clear keyboard can be applied to a touch-sensitive display screen (e.g., as a removable overlay or formed onto the screen) to augment an on-screen keyboard display with tactile feedback. A feeling of a physical key and its position can provide haptic feedback, and hysteresis (e.g., a non-linear force response) can provide a tactile "click" as one may receive when actuating an actual physical key. As provided herein, the systems can allow a manufacturer to utilize large display screens, while minimizing a use of hardware buttons. That is, advantages of both a touch screen and hardware buttons are realized while mitigating associated disadvantages.

In one embodiment, an apparatus for use over a touch-sensitive display screen can comprise a plurality of button structures, such as round or square keys, which are made of an optically clear material. The buttons can be disposed in an optically clear fluid (e.g., or soft elastomer), where both the buttons and the fluid have a same or substantially the same index of refraction. Further, the apparatus can utilize an optically clear elastomeric membrane over the fluid, which forms a sealed barrier for the fluid. The volume within the sealed portion of the apparatus can contain merely the fluid and the button structures, for example, with no air within the sealed portion.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figures 1A, 1B:
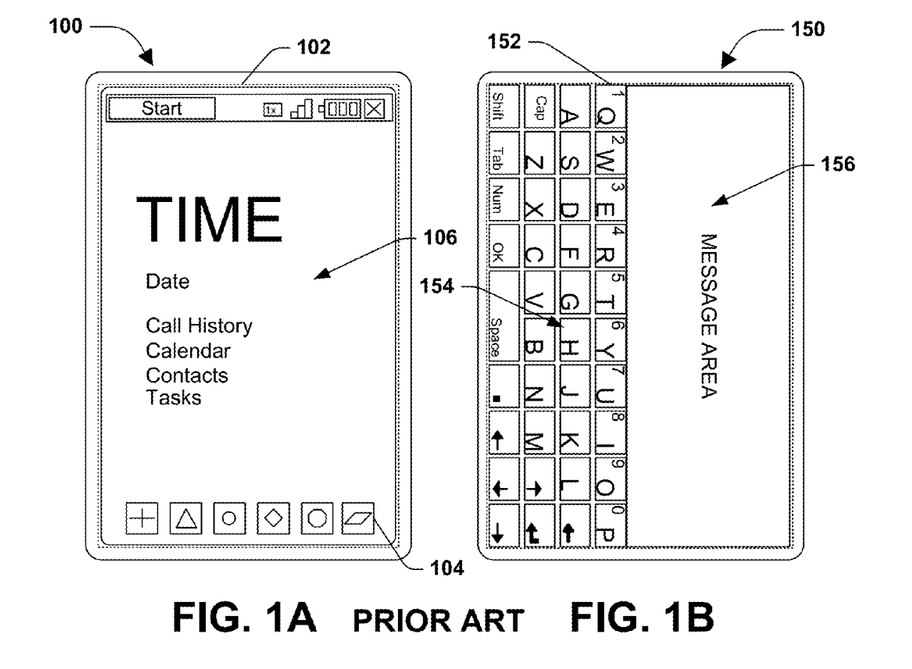
FIGS. 1A and 1B are illustrations of exemplary displays utilized by touch-sensitive display screen devices

FIGS. 1A and 1B illustrate examples of various displays that may be utilized by touch-sensitive display screen devices. The display 100 in FIG. 1A has a display area 102 that comprises an area 106 where information may be viewed, such as time, date, and other information. This type of configuration, for example, is often utilized by mobile smart phones, where information may change in the display area 102 depending on functions that are activated (e.g., the display may show a phone number for an incoming call, or a browser screen when a user access the Internet). Further, virtual buttons 104 are displayed, which a user may select to perform functions associated to the buttons, for example, depending on software configurations attached to the respective virtual buttons 104.

The display 150 in FIG. 1B also has a display area 152 which comprises a plurality of virtual buttons 154, configured to implement a QWERTY keyboard layout. In this example, a user may type a message using the QWERTY keyboard buttons 154, which can be viewed in a message area 158. This type of configuration, for example, is often used when a user is typing instant messages, emails, or some other form of test input (e.g., in a word processing program).

Figure 2:
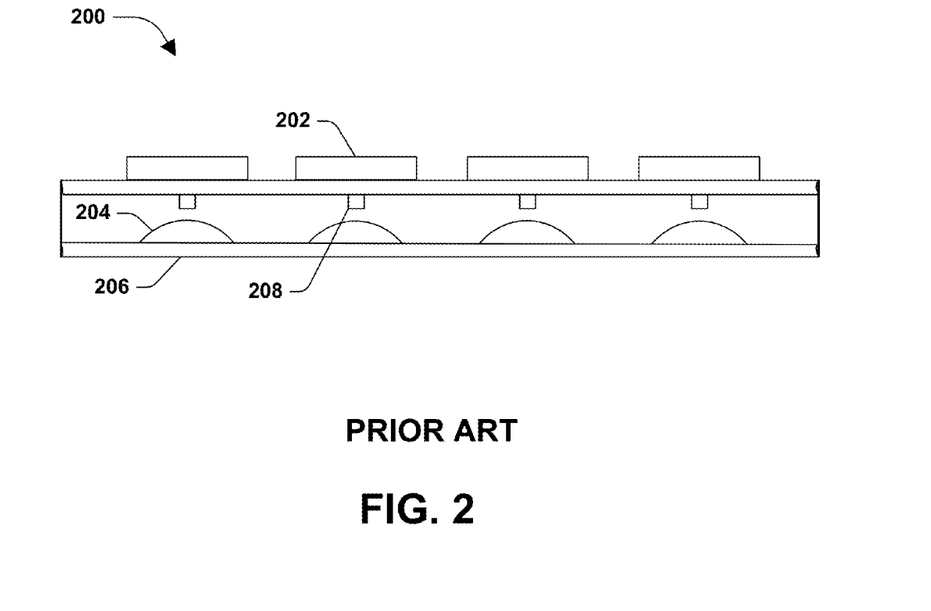
FIG. 2 is an illustration of an example hardware keyboard configuration.

FIG. 2 is an illustration of an example hardware keyboard configuration 200, such as can be found with typical computers (e.g., desktops and laptops) and keyboards on portable devices (e.g., smart phones that comprise hardware keyboards). The exemplary keyboard 200 comprise hard keys 202 on an upper side of the keyboard, which can provide spatio-tactile feedback to a user (e.g., to find home keys). When a key 202 is depressed a nib structure 208 contacts a convex structure, such as a tactile or snap dome, that provides a hysteresis response (e.g., a non-linear force response) to a user when they depress the key 202. In this example, a circuit board 206 can detect when the key 202 is depressed and exceeds a preset hysteresis threshold, for example by the force applied, and/or by some electrical connection made when the center of the convex structure 204 contacts the surface of the circuit board 206.

An apparatus can be devised that may provide for combining the utility of touch-sensitive display screens (e.g., lower cost, larger display area, and configurability of keys) with the tactile advantages of hardware-type keys (e.g., haptic feedback, and hysteresis response). An optically clear apparatus may be applied over a touch-sensitive display screen, having solid button structures to provide for the tactile feedback to a user. Where prior solutions may obscure or distort an underlying image on the display, the systems described herein can provide a clear view of the display.

Figure 3A:
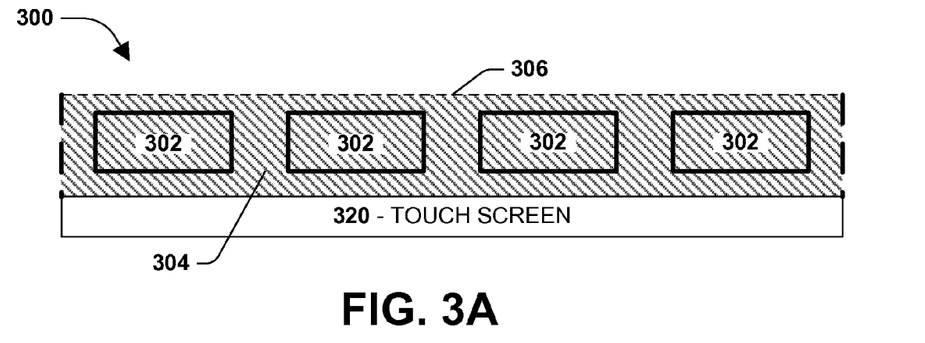
FIGS. 3A through 3C are component diagrams of an apparatus for use over a touch-sensitive display screen.
Figure 3B:
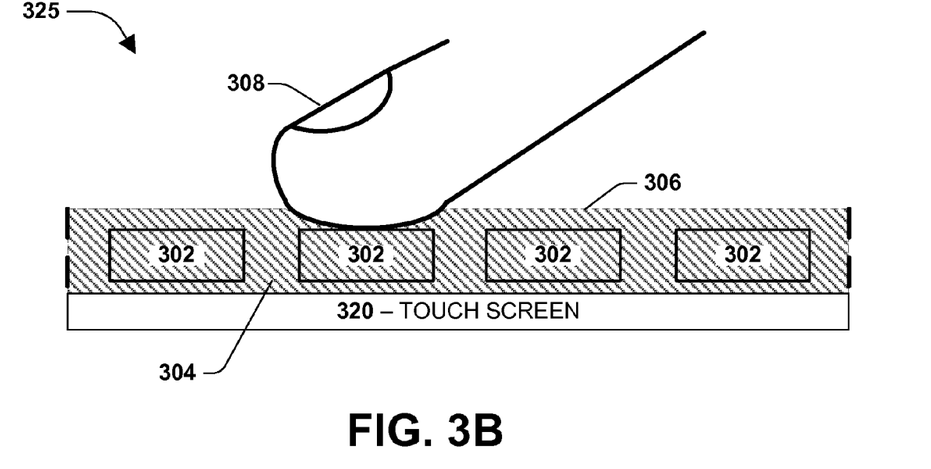
Figure 3C:
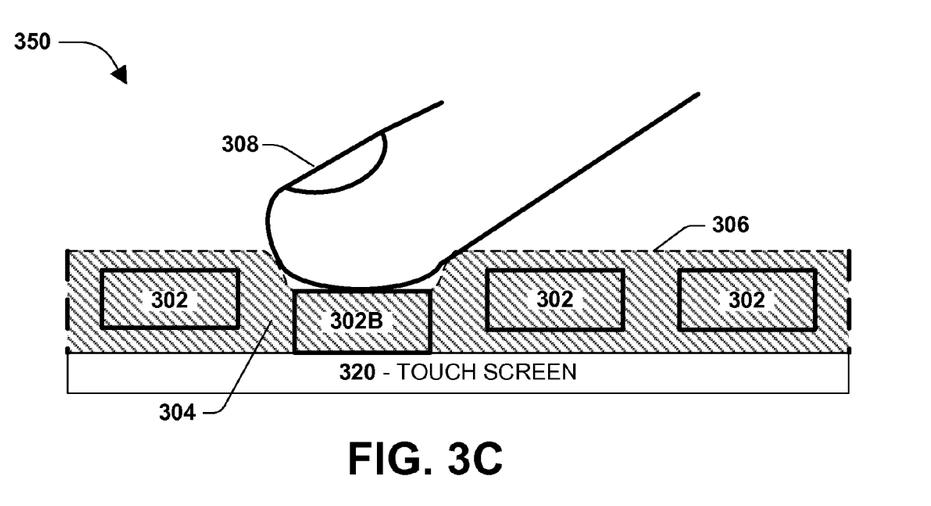

FIGS. 3A through 3C are component diagrams 300, 325 and 350 of an apparatus for use over a touch-sensitive display screen. A plurality of button structures 302 are formed of an optically clear material. The button structures 302 are disposed in an optically clear fluid 304 (e.g., or elastomer), where an index of refraction of the fluid 304 is equivalent to an index of refraction of the button structures 302. As an example, where a solid structure comprises a same index of refraction as a fluid in which it is disposed, the solid structure becomes virtually invisible to one viewing the fluid (e.g., like clear ice in a glass of water).

An optically clear elastomeric membrane 306 forms a sealed barrier over the fluid 304, for example, preventing the fluid 304 from leaking from the apparatus. The volume within the sealed portion formed by the membrane 306 comprises merely the fluid 304 and the button structures 302, for example, such that no air is present in the sealed portion.

In this way, in one embodiment, a user may be provided with tactile feedback, for example, by feeling the buttons 302 under the elastomeric membrane 306, as illustrated in 325 or FIG. 3B. The button structures 302 can comprise haptic structures (e.g., solid key-like buttons), such that haptic feedback (e.g., touch feedback) can be provided to the user. As an example, in FIG. 3B an interacting finger 308 is partially depressing the elastomeric membrane 306 in an act of discovering relative spatial positions of the button structures 302 through a spatio-tactile sensation but not yet actuating the button structure 302. Further, in the example 350 of FIG. 3C, the chosen button structure 302 is fully depressed for actuation. Additionally, when the user selects a desired button structure 302B, it can be depressed to make contact with an underlying touch screen 320. In this embodiment, due to the nature of the elastomeric membrane and the fluid, the fluid can migrate away from the selected button 302B allowing for it to make contact with the touch screen 320.

Figure 4:
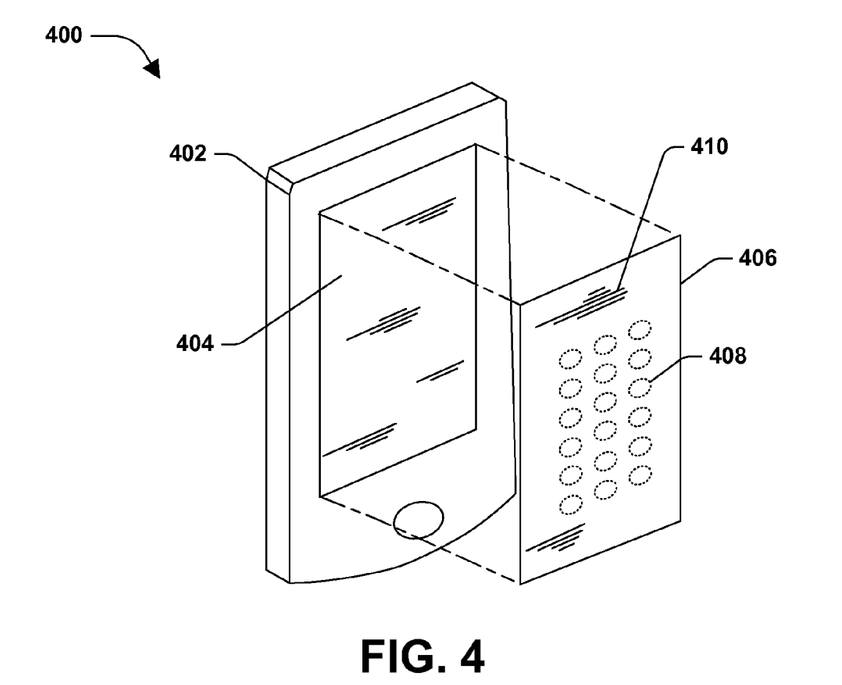
FIG. 4 is an illustration of one embodiment for application of the one or more exemplary systems described herein.

FIG. 4 is an illustration of one embodiment 400 for an application of the exemplary system 300. In this embodiment 400, the apparatus 406, which comprises the buttons 408 disposed in the fluid (not pictured) and the membrane 410, can be applied over a touch sensitive display screen 404 of a device 402. In one embodiment, the apparatus 406 may be integral to the display screen 404, for example, such that the display screen 404 forms a lower barrier of the sealed portion of the apparatus 406.

In one embodiment, the apparatus 406 may be configured to be selectively removable from the touch-sensitive display screen 404. In this embodiment, an optically clear second membrane can be disposed co-planer to the first membrane. In the exemplary embodiment 600 of FIG. 6A, the second membrane 604 comprises an upper surface in contact with the fluid 610 and forming a bottom portion of the sealed barrier for the fluid in combination with the first membrane 602.

Further, the lower surface of the second membrane 604 is configured to be in contact with at least a portion of a touch-sensitive display screen. As an example, as shown in the exemplary embodiment 500 of FIG. 5, the apparatus 502 may be sized to be fitted over at least a portion of the display screen 508 that corresponds to the virtual keys of the touch-sensitive display, and removed when not in use. In another embodiment, as shown in 400 of FIG. 4, the apparatus 406 may be sized to be fitted over the entirety of the display screen 404.

In one embodiment, the fluid may comprise a gel, such that if one or more membranes is ruptured leaking of the fluid may be mitigated. In another embodiment, the fluid may comprise an elastomer that comprises fluid-like properties, such as an ability to migrate away from pressure being applied to its volume (e.g., when a finger depresses the membrane into the elastomer, as illustrated in 325 and 350 of FIGS. 3B and 3C).

Further, the apparatus is not limited to be sized for mobile device displays, for example, touch screen are often utilized in kiosk-style systems, such as remote Internet access sites, and airport ticket terminals. In one embodiment, the button structures can implement a layout that matches a displayed virtual key layout for the touch-sensitive display screen. In another embodiment, the button structures can implement a desired layout for which the device can be configured to display corresponding virtual keys.

Figure 5:
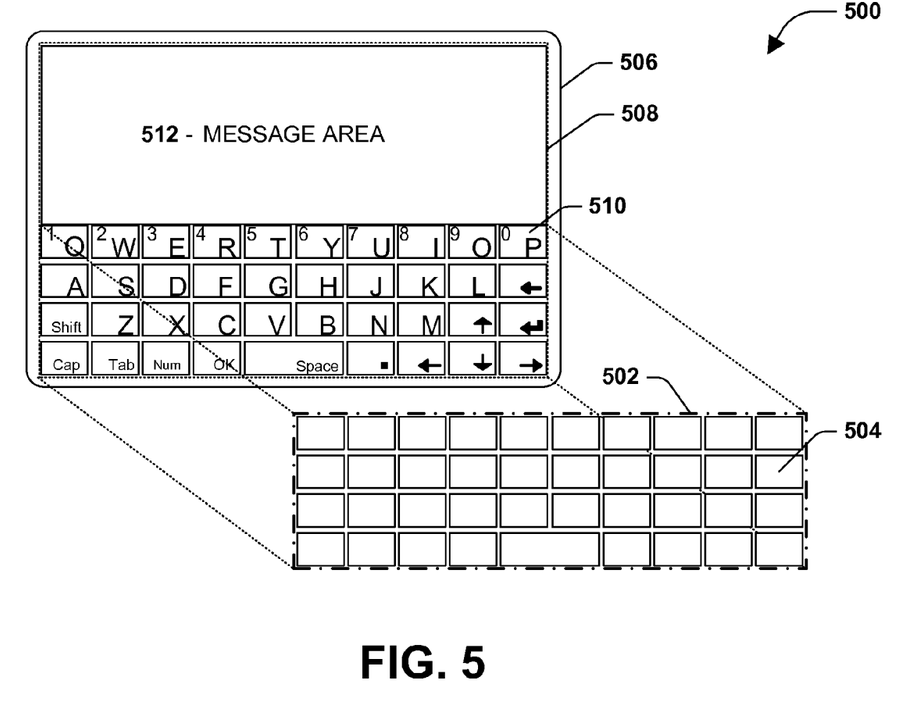
FIG. 5 is an illustration of one embodiment for application of the one or more exemplary systems described herein.

In one embodiment, as shown in 500 of FIG. 5, the button structures 504 can implement a QWERTY keyboard layout 510. In this example, the apparatus 502 can be applied over the touch-sensitive display screen 508 of the device 506, so that the keys 504 of the apparatus 502 correspond to the virtual QWERTY keyboard 510 of the device 506. This exemplary embodiment 500, comprises a landscape-type display layout, however, in another embodiment, the layout may comprise a portrait display or another configuration appropriate for the display 508.

In another embodiment, such as a display augmented touch sensitive table surface, the button overlay device, for example, can be temporarily placed anywhere on the display surface and become a haptic feedback, interactive input to the system. In this embodiment, the table touch system can determine a location of the button overlay device as well as determine when a button is pressed. In this way, the display surface remains and uncluttered except where the device is placed. The buttons can be placed where the user wants them at a time they are used or removed if not needed.

Figure 8:
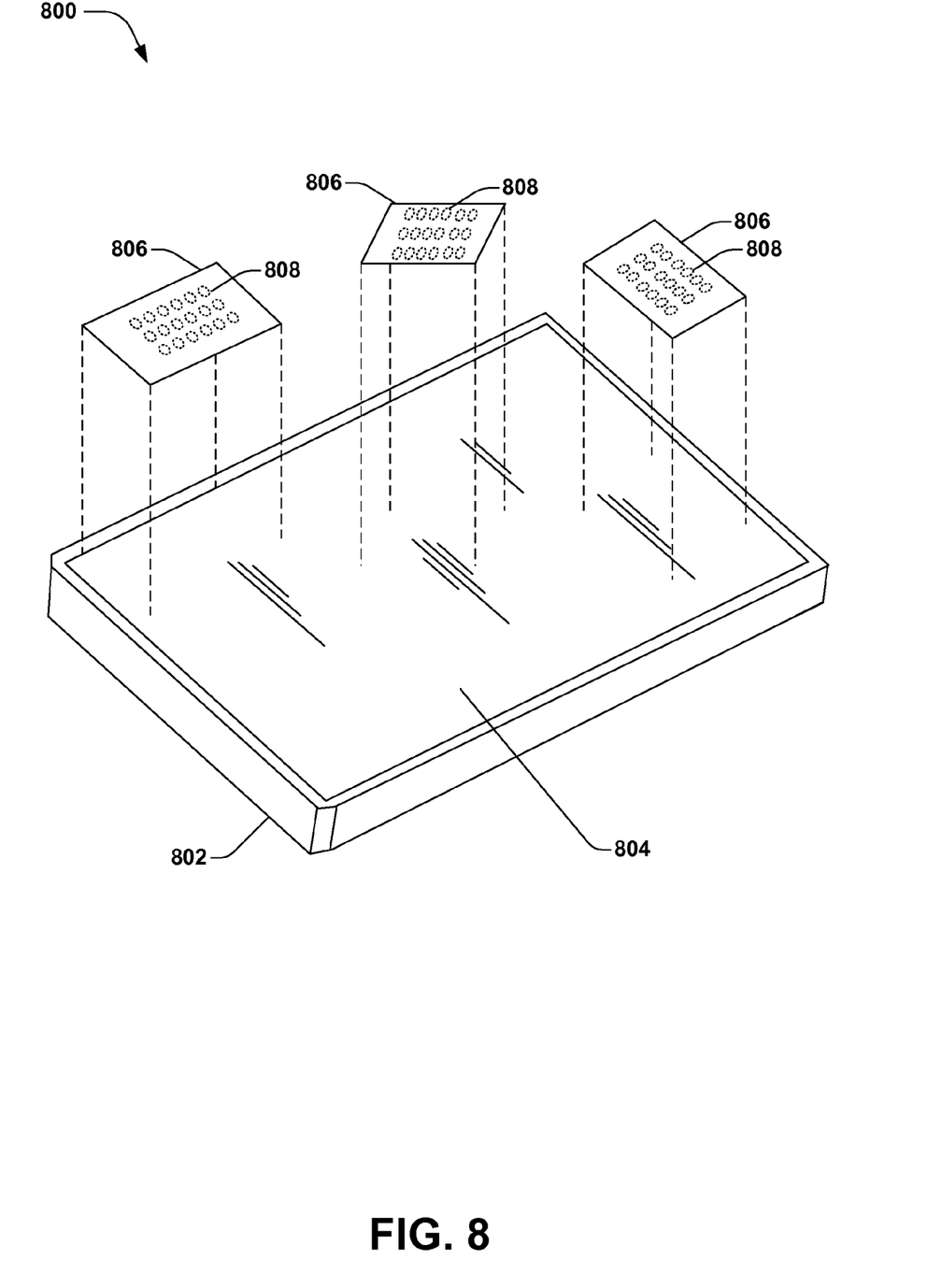
FIG. 8 illustrates an example of a touch sensitive table surface device comprising a touch sensitive surface.

FIG. 8 illustrates one example 800 of this embodiment, where a touch sensitive table surface device 802 comprises a touch sensitive surface 804. In this example, the touch sensitive table surface device 802 may be configured to display a plurality of icons, soft-keys and other interactive displays, such as pictures, on its display. In this embodiment 800, the button overlay device 806 can be placed and selectively removed from a plurality of locations on the touch sensitive surface 804, for example, depending on what is being displayed, and possibly an orientation of the display (e.g., the display may implement a display in a plurality of orientations based on user preference). Further, the key configuration 808 may comprise a grid pattern, an application specific pattern, a QWERTY keyboard layout, or some other design that can be used to interact with the display screen 804.

Figure 6A:
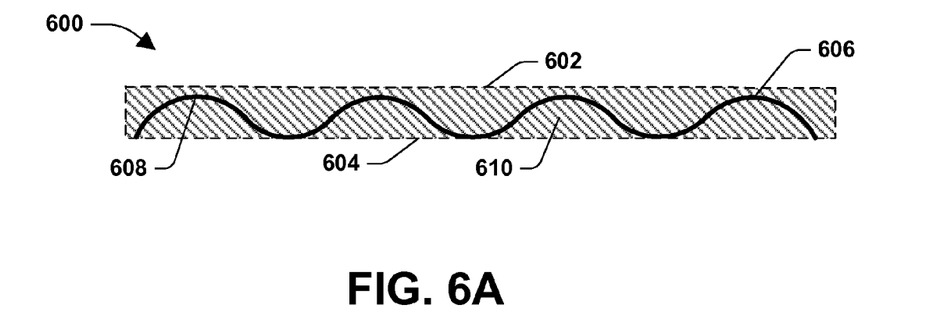
FIGS. 6A through 6D are illustrations of exemplary embodiments where the button structures are configured to provide hysteric response to a user.

FIG. 6A is an illustration of one exemplary embodiment 600 where the button structures are configured to provide hysteretic response to a user. In this exemplary embodiment 600, the button structures 606 are configured to provide a hysteretic action to a user when force is applied by the user. For example, the button structures can comprise a relatively stiff polymer material that provides a certain amount of resistance when force is initially applied, and that can collapse under an increased amount of pressure such that the force needed for further downward travel is significantly reduced, thereby providing a hysteretic action (non-linear force response—less resistance as more force is applied). In this example, the hysteretic action can also provide a "click" or button actuation feel to the user, much like a hardware keyboard (e.g., as in FIG. 2). In this embodiment, the action can also allow a key most centered on the actuating finger pad to reach a hysteresis threshold earlier than those of the neighboring keys which may also be depressed, causing that (centered) key to travel further downward and can be the first key to be sensed as actuated.

Figure 6B:
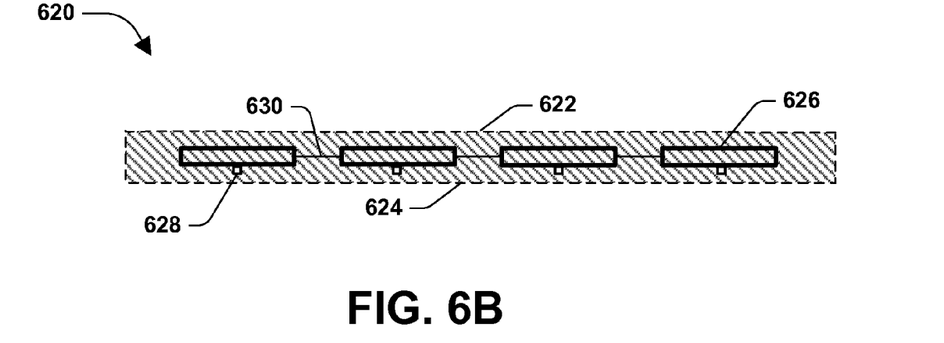

In another embodiment, as illustrated by FIG. 6B, the apparatus 620 may comprise a plurality of nib structures 628 integral (e.g., attached to or formed with) to the button structures 626. The nibs 628 can be disposed between the button structures 626 and the surface of the touch-sensitive display screen, or second membrane 624, and provide a pressure contact area to the touch-sensitive display screen when force is applied to a button structure 626. Touch sensitive display screens can be of a resistive-type, where a location of a touch can be determined by force applied to the screen. As an example, the nibs 628 may correspond to an approximate center of virtual keys on the display, and can actuate the virtual keys when force is applied to the button structures 626.

Further, in one embodiment, button structures can be aligned within the fluid using various means. For example, as shown in 600 of FIG. 6A, the button structures 606 may be comprised of one or more continuous elements arranged such that a top of the elements comprises a button. As another example, as shown in FIG. 6B, the button structures 656 may be attached by an anchoring element 660, such that the button structures 656 can be attached to each other to form one or more button sheets.

Figure 6C:
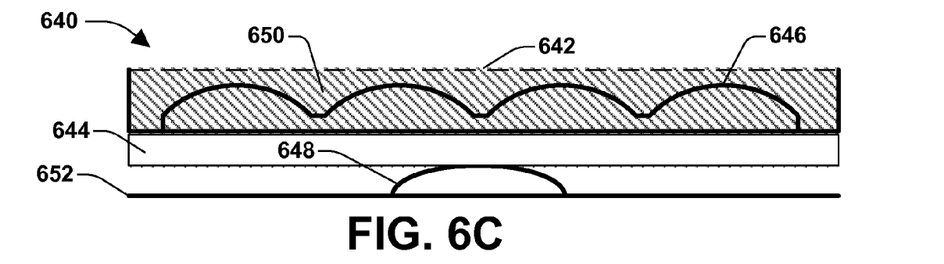

In another embodiment, the apparatus can comprise one or more hysteretic structures disposed between at least a portion of the display screen and at least a portion of a device that comprises the display screen. In FIG. 6C, for example, the exemplary apparatus 640 comprises the button structures 646 disposed in a fluid 650 and sealed to the display screen 644 by the membrane 642. In this embodiment, a hysteretic structure 648 is disposed beneath the display screen 644, such that it is implemented between the screen 644 and a device 652 that houses the screen 644.

Figure 6D:
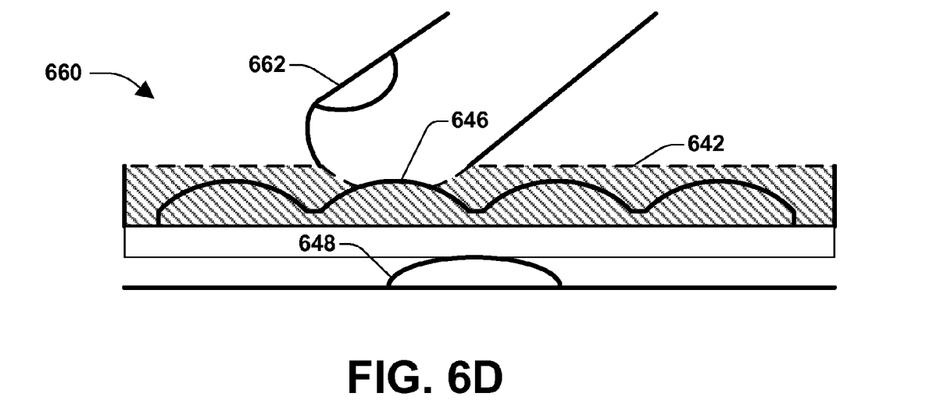

In FIG. 6D, a user's finger 662 can detect the button structure 646 beneath the membrane 642. The finger 662 can apply a downward force to the button structure 646, which in turn can affect a downward force on the hysteretic structure 648. As described above, hysteretic feedback can be felt by the user's finger 662, for example, as the dome structure of the hysteretic structure 648 collapses. Further, for example, feedback from a key "click" or button actuation sensation can be felt or heard by the user when the dome structure of the hysteretic structure 648 collapses.

In one aspect, the apparatus may comprise one or more optically planer membranes that are disposed coplanar to the surface of the touch-sensitive display screen when the apparatus is applied to the screen. In a preferred embodiment, the membranes that comprise the apparatus are optically planer, such that light is not refracted in disparate directions, producing a distortion for the display. For example, if a membrane has a wrinkle or similar defect, light can be refracted from than distortion. Further, the apparatus can comprise additional membranes, for example, where the respective membranes are co-planer to each other, such that light is directed toward a user's viewing point.

Figure 7A:
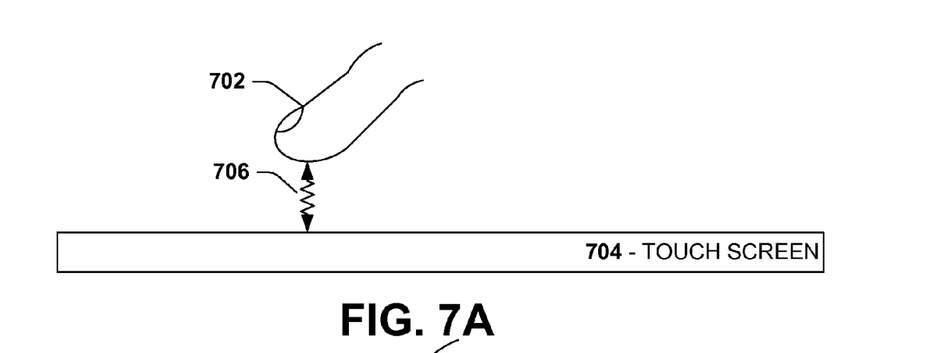
FIG. 7A is an illustration of an implementation of a touch-screen.

In another aspect, touch sensitive display screens can be of a capacitive type, where the device determines a capacitance of what is touching the screen. As an example, as shown in FIG. 7A, a touch screen 704 can sense a user's touch 702 by detecting a bulk capacitance for the screen, provided by electrical conduction 706 between the user's finger and the surface of the display. In this aspect, in one embodiment, the apparatus can comprise z-axis (e.g., conduct in merely the z-axis, not an x or y axis) conductive elements that provide electrical conduction from the membrane to the touch-sensitive display screen. The z-axis conductive elements can be integral with (e.g., physically attached or imbedded) the membrane and/or the button structures. In one embodiment, if the device's capacitance sensitivity is sufficient, z-axis conductive elements may not be required where the capacitance touch screen would operate properly through the thickness of the overlay.

Figure 7B:
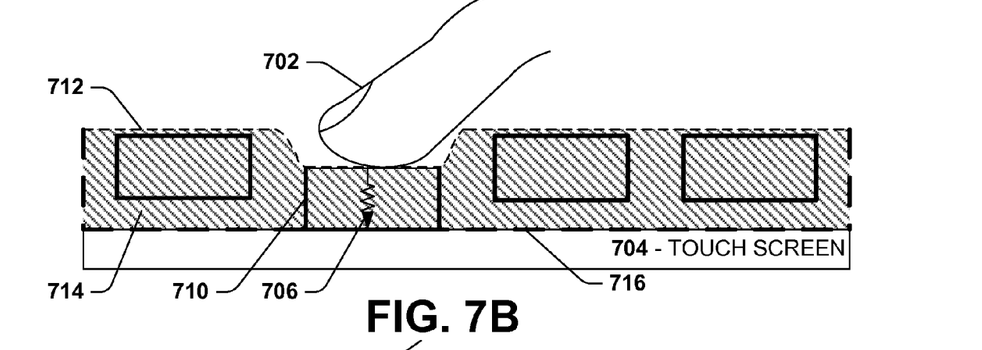
FIG. 7B through D are illustrations of exemplary embodiments of how conduction may be implemented in the one or more systems described herein.

In one embodiment, the apparatus may comprise one or more second membranes with integral z-axis conductive elements. FIG. 7B illustrates an example of how z-axis elements may be implemented in the apparatus. The user 702 presses down a button structure 710, and electrical conduction 706 can be made through the first membrane 712, the button structure 710, and the second membrane 716, to the touch screen 704 where bulk capacitance can be measured for the user's touch 702.

Figure 7C:
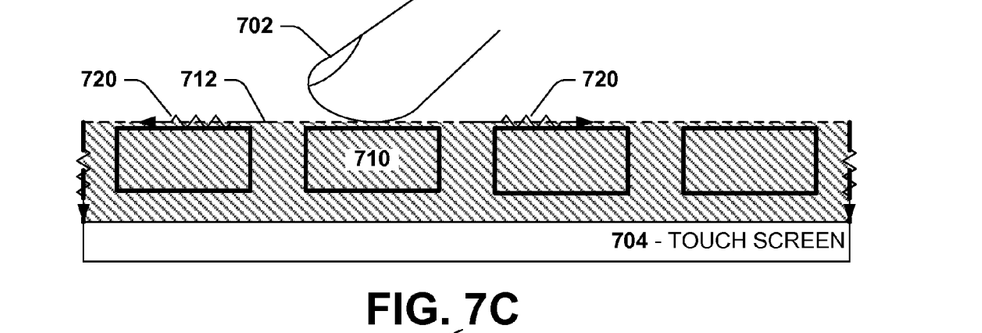

In another embodiment, the apparatus may comprise a conductive material integral with the membrane that provides for capacitance detection for the touch-sensitive display screen when the apparatus is operably coupled to the touch-sensitive display screen. For example, as shown in FIG. 7C, a user may merely desire to actuate a device function without pressing keys, such as swiping 702 across the surface to move displayed icons on the screen. In this example, the conductive material that is integral with the membrane 712 can provide from electrical conduction 720 across the membrane 712, for example, to the display screen 704. In this example, the display screen can detect the movement across the membrane surface and perform corresponding functions. In one embodiment, if the device's capacitance sensitivity is sufficient, additional conductive may not be required where the capacitance touch screen operates properly through a thickness of the overlay.

Figure 7D:
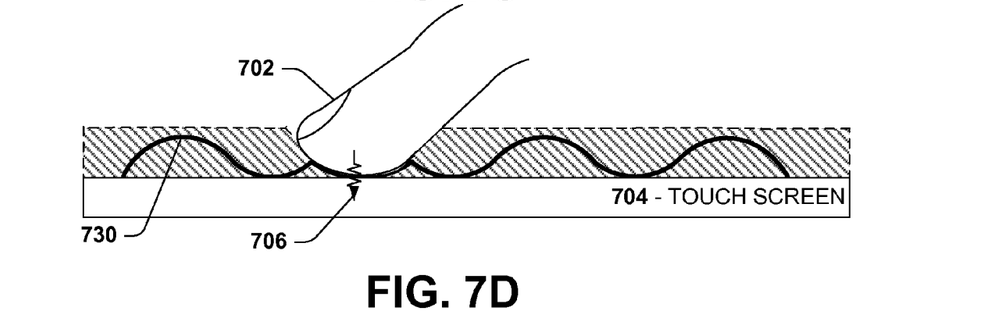

FIG. 7D is an illustration of one embodiment where conduction is implemented using button structures that provide a hysteretic response. In this example, merely an approximate center area of a button structure 730 may comprise the z-axis conductive elements. Here, when the user 702 actives the button structure 730, electrical conduction 706 can be provided through the center portion of the button structure 730 to the touch screen 704. Further, in another embodiment, nib structures (e.g., as in FIG. 6B, 658) may be disposed on an underside 730 of the button structures. As an example, the nib structures can also be conductive, allowing for combined resistive and conductive response for the display screen 704.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An apparatus for use with a touch-sensitive display screen, comprising:
   one or more button structures formed of an optically clear material, and disposed over the touch-sensitive display screen in an optically clear fluid having an index of refraction substantially equivalent to an index of refraction of at least some of the one or more button structures;
   a first optically clear elastomeric membrane over the optically clear fluid forming a sealed barrier; and
   a hysteretic structure formed beneath a button structure and configured to provide a non-linear force response when a force is applied to the button structure through at least the first optically clear elastomeric membrane and the optically clear fluid, the non-linear force response corresponding to increasing resistance provided before the button structure is activated by the force but little to no resistance provided after the button structure is activated by the force, the button structure corresponding to merely one key comprising a letter or a number, where application of additional force to the button structure after the button structure is activated does not activate another key other than the merely one key, the hysteretic structure associated with the button structure and a second button structure.

2. The apparatus of claim 1, the hysteretic structure formed beneath the touch-sensitive display screen.

3. The apparatus of claim 1, at least some of the one or more button structures configured to form a virtual key layout for the touch-sensitive display screen.

4. The apparatus of claim 3, the virtual key layout comprising a QWERTY format.

5. The apparatus of claim 1, at least some of the one or more button structures comprising a bulk capacitor sensor.

6. The apparatus of claim 1, the hysteretic structure configured to collapse based upon the force exceeding a hysteresis threshold.

7. The apparatus of claim 1, the optically clear fluid comprising at least one of:
   a gel; or
   an elastomer.

8. The apparatus of claim 1, the first optically clear elastomeric membrane comprising a size corresponding to at least a portion of the touch-sensitive display screen.

9. The apparatus of claim 1, comprising one or more optically planer membranes disposed coplanar to a surface of the touch-sensitive display screen when the apparatus is operably coupled with the touch-sensitive display screen.

10. The apparatus of claim 1, comprising one or more z-axis conductive elements configured to provide electrical conduction from the first optically clear elastomeric membrane to the touch-sensitive display screen via at least some of the one or more button structures.

11. The apparatus of claim 1, comprising a second optically clear elastomeric membrane below the one or more button structures and the optically clear fluid and comprising one or more z-axis conductive elements configured to facilitate electrical conduction to the touch-sensitive display screen.

12. The apparatus of claim 1, comprising a conductive material integral with the first optically clear elastomeric membrane and configured to provide capacitance detection for the touch-sensitive display screen.

13. The apparatus of claim 1, comprising one or more nib structures corresponding to at least some of the one or more button structures and configured to provide a contact area to the hysteretic structure.

14. The apparatus of claim 1, configured to be selectively removable from the touch-sensitive display screen.

15. An apparatus for tactile feedback in use with a display screen, comprising:
   a first optically clear elastomeric membrane sized to cover at least a portion of the display screen, and configured to contain an optically clear fluid and form a sealed portion;
   the optically clear fluid having a desired index of refraction;
   one or more button structures disposed over the display screen in the optically clear fluid and having an index of refraction substantially equivalent to the desired index of refraction; and
   a hysteretic structure formed beneath a button structure and configured to provide a non-linear force response when a force is applied to the button structure through at least the first optically clear elastomeric membrane and the optically clear fluid, the non-linear force response provided before the button structure is activated by the force, the button structure corresponding to merely one key, where application of additional force to the button structure after the button structure is activated by the force does not activate another key other than the merely one key.

16. The apparatus of claim 15, the first optically clear elastomeric membrane comprising a conductive layer configured to provide electrical conduction to the display screen.

17. The apparatus of claim 15, at least some of the one or more button structures comprising conductive material configured to provide electrical conduction from the first optically clear elastomeric membrane to the display screen.

18. The apparatus of claim 15, comprising a second optically clear elastomeric membrane disposed coplanar to the first optically clear elastomeric membrane, the second optically clear elastomeric membrane comprising one or more conductive layers configured to provide electrical conduction to the display screen.

19. The apparatus of claim 15, the optically clear fluid comprising at least one of:
   a gel; or
   an elastomer.

20. An apparatus for use with a touch-sensitive display screen, comprising:
   one or more button structures formed of an optically clear material, and disposed in an optically clear fluid having an index of refraction substantially equivalent to an index of refraction of at least some of the one or more button structures;
   a first optically clear elastomeric membrane over the optically clear fluid forming a sealed barrier; and a hysteretic structure formed beneath a button structure and configured to provide a non-linear force response when a force is applied to the button structure through at least the first optically clear elastomeric membrane and the optically clear fluid, the non-linear force response corresponding to changing resistance provided before the button structure is activated by the force, the button structure corresponding to merely one key comprising a letter or a number, the hysteretic structure associated with the button structure and a second button structure.

* * * * *